United States Patent [19]

Rivory

[11] 4,206,021

[45] Jun. 3, 1980

[54] PROCESS FOR THE PRODUCTION OF PIGMENTARY TITANIUM DIOXIDE BY THE SULPHURIC ACID METHOD

[75] Inventor: Marc X. Rivory, Neuilly sur Seine, France

[73] Assignee: Thann et Mulhouse S.A., Thann, France

[21] Appl. No.: 15,661

[22] Filed: Feb. 27, 1979

[30] Foreign Application Priority Data

Mar. 2, 1978 [FR] France .................... 78 06879

[51] Int. Cl.² .............................................. C25B 1/00
[52] U.S. Cl. ........................................................ 204/96
[58] Field of Search ........................................... 204/96

[56] References Cited

U.S. PATENT DOCUMENTS

| 1,235,638 | 8/1917 | Barton | 204/96 |
| 1,333,849 | 3/1920 | Olsen et al. | 204/96 |

Primary Examiner—Howard S. Williams
Attorney, Agent, or Firm—Lewis H. Eslinger

[57] ABSTRACT

In the sulphuric acid process for the production of pigmentary titanium dioxide from titaniferous ores such as ilmenite, in which the sulphuric acid digestate is reduced electrolytically in the cathode compartment of an electrolytic cell, to convert Fe III in the digestate to Fe II, substantial reductions in electric power consumption can be achieved by introducing a ferrous sulphate solution as anolyte instead of sulphuric acid. The ferrous sulphate used is preferably recycle material obtained in the catholyte in an earlier reduction cycle.

8 Claims, 1 Drawing Figure

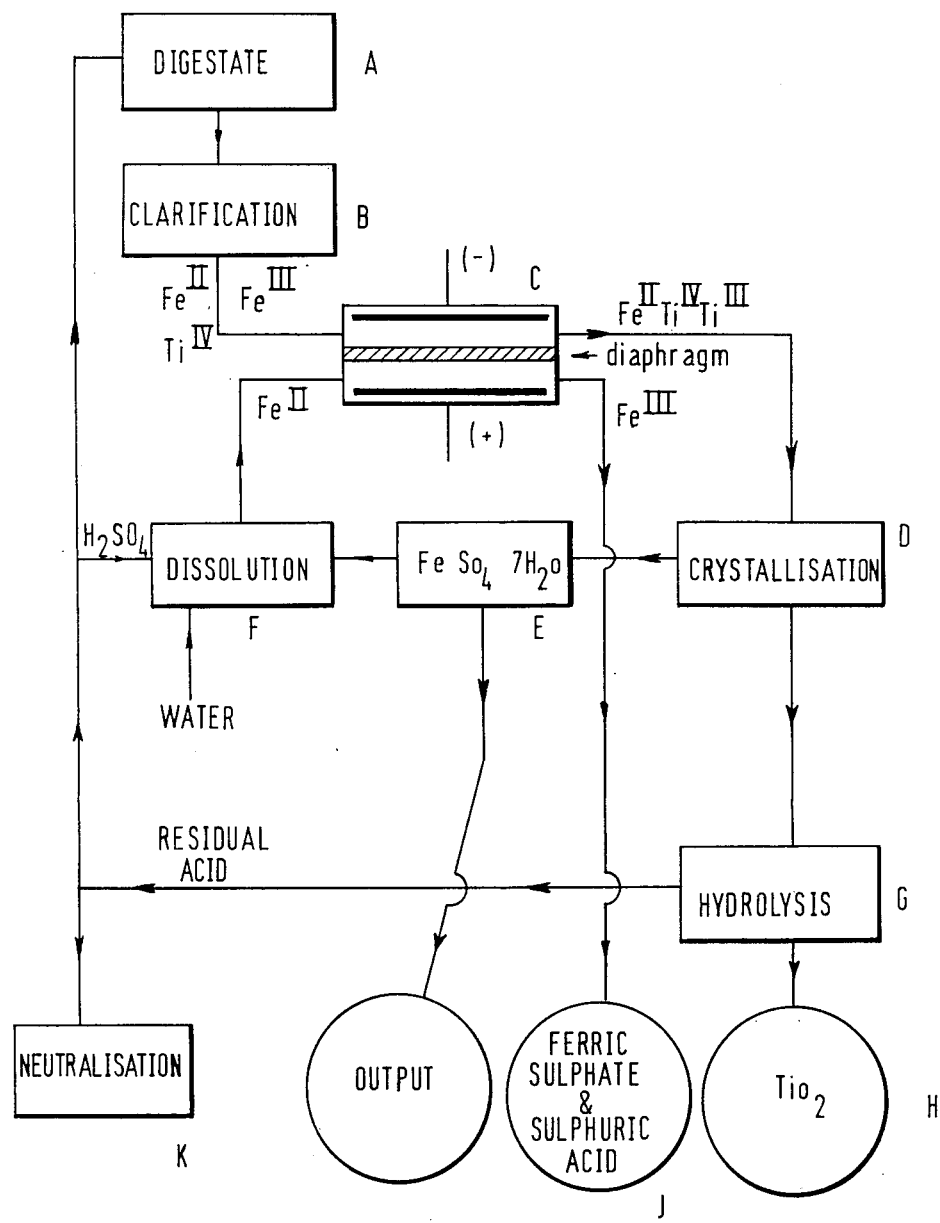

PROCESS FOR THE PRODUCTION OF PIGMENTARY TITANIUM DIOXIDE BY THE SULPHURIC ACID METHOD

This invention relates to the production of pigmentary TiO2 by the sulphuric acid method, involving electrolytic reduction of titanium-bearing solutions in an electrolytic cell having a diaphragm.

The standard sulphuric acid process involves reduction of the digestate of the sulphuric acid and the titanium-bearing ore (e.g. ilmenite) and which also contains ferric sulphate by the reduction of the latter with metallic iron. One of the drawbacks of this reduction is that it increases the amount of iron sulphate to be eliminated and the amount of sulphuric acid required.

Processes are also known in which the reduction is carried out electrolytically. In these processes the solution to be reduced is contained in the cathode compartment, while the anode compartment contains a sulphuric acid solution. These electrolytic processes do not produce any additional iron sulphate, but they give rise to considerable power consumption.

We have now found that the power consumption requirements can be reduced in the electrolytic reduction processes if the anode compartment contains a ferrous sulphate solution.

Accordingly, the present invention provides a process for the production of pigmentary titanium dioxide from an iron and titanium-bearing ore by the sulphuric acid process wherein the sulphuric acid/ore digestate is electrolytically reduced in at least one cathode compartment of an electrolytic cell having at least one diaphragm separating an anode compartment from a cathode compartment and having a ferrous sulphate solution in at least one anode compartment, removing the reduced solution from the cathode compartment and recovering pigmentary titanium dioxide from the reduced solution.

It is advantageous that the ferrous sulphate introduced into the anode compartment be ferrous sulphate that has been recovered from cathode compartment solution reduced in an earlier cycle of the process.

It is also advantageous that the sulphuric acid/ore digestate introduced into the cathode compartment is previously clarified e.g. by treatment with a flocculating agent, and that the digestate introduced has a Fe III/Fe II ratio of 0.2:1 to 0.8:1.

It is convenient to isolate the ferrous sulphate from reduced catholyte as the heptahydrate and this ferrous sulphate heptahydrate then recycled to the anodic compartment after first being dissolved in water and preferably also residual sulphuric acid from the hydrolysis to form an acid solution containing 150 to 350 g $H_2SO_4$ per liter, and containing 30 to 80 g of Fe II ion per liter.

In accordance with another preferred feature of the invention, a low voltage is applied across the terminals of the electrolytic cell at the same time as ferrous sulphate solution is continuously introduced into the cell as anolyte and the digestate is continuously introduced as catholyte, and a sulphuric acid solution of ferric sulphate as well as a reduced digestate are continuously removed from the cell, the current density being 0.3 to 10 $A/dm^2$.

The process of the invention is economical because it involves recycling of part of the reaction by-products, ferrous sulphate and residual acid, without significant additional energy consumption, and this consumption may even be nil in the case of electrolytic reduction if the latter is performed, for example, in a cell in short-circuit.

In practice, it is advisable to apply a voltage to accelerate the process. The replacement of the sulphuric acid of the known procedures with ferrous sulphate as an anolyte brings about a considerable reduction in the electrical power necessary for the electrochemical reduction of the digestate.

Apart from this significant economic advantage, the invention also permits easy, rapid conversion of the ferrous sulphate to ferric sulphate, as well as the production of ferric sulphate solutions which are suitable, for example, for water treatment.

In general, the invention offers the essential technical advantage of being simple, of realising electric power savings in comparison with electrolytic reduction using sulphuric acid as anolyte, while it upgrades the residual sulphate to the form of ferric sulphate.

The process of the invention can be carried out in an electrolytic cell similar to that used in the known process for electrolytic reduction of the digestate using sulphuric acid as anolyte. One such suitable cell is described in French Patent Publication No. 2,363,642. The cell to be used in the process of the present invention is preferably one in which the electrodes and diaphragms are made of materials which are inert, i.e. they do not give rise to spurious phenomena. Platinum, platinum-plated titanium, or graphite, for example, are suitable both for the anode and the cathode.

The choice of the cell diaphragm is also very important. For example, anionic diaphragms yield excellent results. These special diaphragms prevent the migration of protons from one compartment to the other, thus ensuring constancy of the acidity of the titanium containing solution, which is an important advantage for its subsequent conversion to pigment grade titanium dioxide. The use of the diaphragm also avoids titanium losses by diffusion from the cathode compartment toward the anode compartment.

Another significant advantage observed is that the electrochemical reduction of this invention leads to a titanium dioxide whose pigmentary properties are at least equivalent to those of titanium dioxide produced by a process involving reduction of the digestate by metallic iron.

Treatment of the reduced digestate to give pigmentary titanium dioxide is carried out by the standard method, i.e. by hydrolysis in the presence of nuclei, pigmentation of titanium dioxide gel by inorganic salts, and calcination of the pigment grade titanium dioxide gel.

This titanium dioxide was tested by standard paint technology tests. It can be seen that electrolytic reduction yielded comparable results.

The accompanying drawing shows a flow sheet illustrating the process of the invention and is described in more detail in the following Examples which are given to illustrate the invention.

EXAMPLE 1

The ore used was an ilmenite having the following analysis.

|  | % by weight |
|---|---|
| loss at 110° C. | 1.60 |
| dry analysis: | |

|              | % by weight |
|--------------|-------------|
| $TiO_2$      | 54.6        |
| FeO          | 22.0        |
| $Fe_2O_3$    | 18.70       |
| Fe total     | 30.15       |
| MnO          | 1.58        |
| CaO          | 0.018       |
| MgO          | 0.22        |
| $ZrO_2$      | 0.40        |
| $SiO_2$      | 0.97        |
| $Al_2O_3$    | 0.84        |
| $P_2O_5$     | 0.065       |
| $Cr_2O_3$    | 0.033       |
| $V_2O_5$     | 0.14        |
| $Nb_2O_5$    | 0.20        |
| $As_2O_5$    | 0.0022      |
| Insoluble acid | 1.03      |

The acid digestion was carried out by heating 1.48 tons 97.6% sulphuric acid per ton of ore to 60° C. 220 Kg of sulphuric acid recycled from an earlier run and containing 23% $H_2SO_4$ then introduced into the mixture, per ton of ore, and the temperature of the mixture taken up to 190°–200° C. The resulting solid mass was maintained at this temperature for 4 hours to complete the conversion of the oxides to sulphates and then acidic wash water was introduced at the rate of 2.3 tons water and 160 Kg $H_2SO_4$ per ton of ore. The solid dissolved in this wash water over a period of 7 hours, the temperature of the water then being about 70° C. This is a stage A on the flow sheet.

The solids suspended in this digestate were then removed in a decanter after addition of 4 Kg/ton ore, of a cationic polyacrylamide flocculating agent DOW CP35 containing 5% active material. This is stage B on the flow sheet. The resulting clarified digestate had the following analysis.

Ti IV—86.4 g/l
Fe III—36.4 g/l
Fe II—69.2 g/l.

The electrolytic cell used was of the horizontal diaphragm type and is shown at step C on the flow sheet. The porous ceramic diaphragm has an area of 20 cm² and has been treated with a solution of titanium oxychloride and then with ammonia so as to precipitate titanium hydroxide in the pores. The ceramic was then calcined at 500° C. to avoid later redissolving in the acidic solutions with which it comes into contact. This treatment and calcination was repeated 3 times to reduce the porosity of the diaphragm which then has reduced permeability to ions.

The electrodes used in the cell are of graphite and each has a surface of 5 cm². The cell was operated at a potential of 0.7 volts and an average current of 0.038 amps.

The clarified digestate was introduced into the cathode compartment while a ferrous sulphate solution with the following composition was introduced into the anode compartment:
Fe II—60 g/l
$H_2SO_4$—200 g/l
This solution came from step F on the flow sheet where the heptahydrate $FeSO_4.7H_2O$ (obtained at step D by crystallisation from the reduced digestate) was dissolved in water with the addition of residual sulphuric acid recovered from hydrolysis of the reduced digestate at step G. That part of the ferrous sulphate not sent to the electrolysis was removed from the system. The electrolysis was operated continuously with the anolyte and catholyte being pumped by peristaltic pumps. The reduced digestate leaving the electrolysis cell had the following composition:
Ti IV—85.3 g/l
Ti III—1.1 g/l
Fe II—105.6 g/l This reduced digestate was then treated conventionally to remove the ferrous sulphate (step D) and to hydrolyse the Ti IV to oxide (step G) from which gel the pigmentary material is recovered (step H). The ferric sulphate solution obtained from the anode compartment was also recovered (step J). The acid liquors recovered from the hydrolysis (step G) were either recycled to the ore digestion (step A), to dissolving ferrous sulphate (step F) or were neutralised and recovered (step K).

For production of five tons of titanium dioxide, 1260 kg of Fe III have been reduced with an energy consumption of 0.56 kWh per kg of reduced iron.

COMPARATIVE EXPERIMENT

For comparative purposes, an electrolytic reduction was carried out but introducing sulphuric acid only as anolyte.

A digestate with the following composition:
Ti IV—85.9 g/l
Fe III—38.1 g/l
Fe II—67.8 g/l obtained by a procedure similar to that of Example 1, was introduced into the cathode compartment of a vertical graphite electrolysis cell of the type described in French Patent Publication No. 2,363,642. The diaphragm, with an area of 400 cm², consists of microporous polyethylene. The anode was of graphite. The cathode consisted of a stack of graphite balls with an average diameter of 1.5 mm, and the collector was of titanium.

The digestate in the catholyte had a starting concentration of 38.1 g of Fe III/liter. The anolyte consisted of a sulphuric acid solution containing 200 g/l. The electrolysis temperature was about 60° C. The voltage across the terminals was 3.8 V. The energy consumption was 1.92 kWh/kg of Fe III reduced with a Faraday efficiency of 92.3%, taking account of the reduction of 1.3 g of Ti IV to Ti III/liter.

Although this electrolytic process is suitable for reduction of Fe III in a ilmenite digestate, producing sulphuric acid and oxygen at the anode, and offers the advantage of eliminating the metallic iron necessary for chemical reduction, the electric power consumption of 1.92 kWh for the reduction of 1 kg of iron is nevertheless far greater than the consumption of 0.56 kWh obtained in Example 1 by anodic recyling of the iron sulphate. Hence the comparison shows that the use of ferrous sulphate and residual acid in the anodic compartment results in a reduction in power consumption by a factor of 3.4 in electrolytic reduction, as compared with the use of sulphuric acid alone.

EXAMPLE 2

The procedure described in the comparative experiment was repeated but replacing the diaphragm employed by an anion exchange diaphragm with an area of 400 cm² (SELEMION) and introducing a sulphuric acid solution containing 200 g/l of acid and 278 g of ferrous sulphate heptahydrate per liter into the anodic compartment. The digestate entering the cathode compartment had a starting concentration of 106 g/l of total Fe, including 69 g/l of Fe II and 37 g/l of Fe III to be reduced. The temperature of the solutions was kept at 50° to 60° C. The ferrous sulphate solution entering the anodic compartment came from steps D, E and F, as shown on the accompanying flow sheet. A constant voltage of 0.8 V was applied across the terminals of the cell until 99% of the Fe III had been reduced, and this voltage was then raised to 1.0 V to reduce the remainder of the Fe III and some of the Ti IV to Ti III. The current density was about 2.5 A/dm$^2$ at the start of reduction and subsequently decreased. The Faraday efficiency approached 100% as long as the Fe II/total Fe ratio remained above 90%. The total Faraday efficiency for total reduction was about 98% and power consumption was 0.43 kWh/kg Fe III.

The reduced digestate leaving the cell had the following composition:
Ti IV—85.5 g/l
Ti III—0.9 g/l
Fe II—106.0 g/l As in Example 1, the power consumption is reduced by a factor of 4.5, compared to the use of sulphuric acid alone as anolyte.

The reduced digestate was cooled and the resulting ferrous sulphate heptahydrate crystals separated for recycle. The digestate was then subjected to hydrolysis to give a titanium hydroxide gel which was converted to pigmentary TiO$_2$ while the residual acid was recycled to dissolve ore and ferrous sulphate. Table 1 below sets out the composition of a digestate before reduction and after reduction by metallic iron or by the Example 2 procedure while Table 2 below sets out certain pigmentary characteristics of pigments obtained from the two reduced digestates.

TABLE 1

| | Analysis of clarified digestate | | |
|---|---|---|---|
| | unreduced | reduced with iron | reduced according to Example 2 |
| Ti IV g/l | 86.4 | 83.6 | 85.3 |
| Ti III g/l | 0 | 2.8 | 1.1 |
| Fe II g/l | 69.2 | 123.2 | 105.6 |
| Fe III g/l | 36.4 | 0 | 0 |

TABLE 2

| | grey paint | | white paint | |
|---|---|---|---|---|
| | Y% | YF% | Y% | YF% |
| reduction by iron | 93.1 | 97.3 | 97.4 | 91.2 |

TABLE 2-continued

| | grey paint | | white paint | |
|---|---|---|---|---|
| | Y% | YF% | Y% | YF% |
| reduction according to Example 2 | 92.5 | 103.3 | 96.9 | 91.7 |

NOTE:
Y% = relative reflectance (Y tristimulus filter) grey and white paint.
YF% = relative under tone in grey and white paint.

I claim:

1. A process for the production of pigmentary titanium dioxide from an iron and titanium-bearing ore by the sulphuric acid process wherein the sulphuric acid/ore digestate is electrolytically reduced in at least one cathode compartment of an electrolytic cell having at least one diaphragm separating an anode compartment from a cathode compartment and having a ferrous sulphate solution in at least one anode compartment, removing the reduced solution from the cathode compartment and recovering pigmentary titanium dioxide from the reduced solution.

2. A process according to claim 1 wherein the ferrous sulphate introduced into the anode compartment is recycle ferrous sulphate that has been recovered from reduced cathode compartment solution obtained by a process according to claim 1.

3. Process according to claim 1 or 2 wherein the sulphuric acid/ore digestate introduced into the cathode compartment is previously clarified by treatment with a flocculating agent.

4. Process according to claim 2 wherein ferrous sulphate heptahydrate is isolated from the reduced cathode compartment solution and the heptahydrate is then dissolved in water and this solution recyled to an anode compartment.

5. Process according to claim 4 wherein the heptahydrate is dissolved in water and residual sulphuric acid from a hydrolysis step.

6. Process according to claim 5 wherein the acid solution of ferrous sulphate contains 150–350 g/l H$_2$SO$_4$ and 30–80 g. ions Fe$^{II}$ per liter.

7. Process according to claim 1 wherein a low voltage is applied across the terminals of the electrolytic cell at the same time as ferrous sulphate solution is continuously introduced as anolyte and the digestate is continuously introduced as catholyte, and a sulphuric acid solution of ferric sulphate and reduced digestate are continuously removed from the cell, the current density being 0.03 to 10 A/dm$^2$.

8. Process according to claim 1 wherein the cell is a vertical or horizontal diaphragm cell having acid-resistant electrodes and a diaphragm selected to prevent diffusion of cations.

* * * * *